United States Patent [19]

Dürsch et al.

[11] Patent Number: 4,696,987
[45] Date of Patent: Sep. 29, 1987

[54] PROCESS FOR THE PREPARATION OF POLYMERS OF VINYLPHOSPHONIC ACID IN PROTIC SOLVENTS

[75] Inventors: Walter Dürsch, Königstein/Taunus; Walter Herwig, Bad Soden am Taunus; Friedrich Engelhardt, Frankfurt am Main, all of Fed. Rep. of Germany

[73] Assignee: Hoechst Aktiengesellschaft, Fed. Rep. of Germany

[21] Appl. No.: 565,862

[22] Filed: Dec. 27, 1983

[30] Foreign Application Priority Data

Dec. 29, 1982 [DE] Fed. Rep. of Germany ....... 3248491

[51] Int. Cl.$^4$ ............................ C08F 4/38; C08F 4/34
[52] U.S. Cl. ................................... 526/216; 526/228; 526/278
[58] Field of Search ..................... 526/278, 216, 228

[56] References Cited

U.S. PATENT DOCUMENTS

| 3,297,663 | 1/1967 | Herbst | 526/278 |
| 4,033,983 | 7/1977 | Starks | 526/278 |
| 4,342,857 | 8/1982 | Gaffar | 526/278 |

FOREIGN PATENT DOCUMENTS

| 1125411 | 3/1962 | Fed. Rep. of Germany | 526/278 |
| 1188658 | 3/1965 | Fed. Rep. of Germany | 526/278 |
| 933107 | 8/1963 | United Kingdom | 526/278 |

Primary Examiner—Christopher Henderson
Attorney, Agent, or Firm—Connolly and Hutz

[57] ABSTRACT

Process for the preparation of polymers of vinylphosphonic acid in protic diluents with the aid of catalysts which form free radicals, which comprises heating vinylphosphonic acid at temperatures of 40° to 130° C. in a total of 10 to 150% by weight of protic diluents for a total of 4–60 hours in the presence of 1.0 to 5.5% by weight of aliphatic peroxy-esters, diacyl peroxides and/or aliphatic azo compounds which decompose by half in one hour at temperatures below 122° C.

6 Claims, No Drawings

PROCESS FOR THE PREPARATION OF POLYMERS OF VINYLPHOSPHONIC ACID IN PROTIC SOLVENTS

BACKGROUND OF THE INVENTION

1. Field of the Invention

This invention relates to the polymerization of vinylphosphonic acid with the aid of a free radical-forming catalyst.

Polyvinylphosphonic acid is of great practical interest, for example for protection from corrosion, flameproof finishes, the production of printing plates and as an additive to washing and cleaning agents.

2. Description of the Prior Art

Polyvinylphosphonic acid has hitherto been prepared according to Examples 7 and 8 of German Pat. No. 1,106,963 with the aid of aprotic solvents, preferably ethyl acetate. It is thereby obtained as a precipitate and must be separated off, for example from ethyl acetate and impurities. The polyvinylphosphonic acid thus obtained still contains about 10% of free vinylphosphonic acid. On filtration by suction, safety measures are necessary, and solvent losses arise. Polyvinylphosphonic acid, which in some cases is nevertheless considerably contaminated by by-products, is also formed when vinylphosphonic acid is polymerized according to Examples 1 and 6 of the same Patent in the absence of solvents. This procedure initially leads to very highly viscous reaction products which are difficult to agitate and finally become solid, and these can no longer be stirred or kneaded. In practice, this procedure therefore cannot be carried out.

A preparation process has thus been sought for vinylphosphonic acid, in which 1. filtration with suction can be omitted,
2. the mixture can be stirred continuously,
3. only a small residual monomer content remains at the end,
4. the reaction products can be further diluted directly, for example with water, and
5. the process can be carried out in water or other protic, water-miscible diluents.

It can be seen from Examples 3, 4 and 5 of German Pat. No. 1,106,963 that the polymerization of vinylphosphonic acid can be carried out in relatively large amounts of protic solvents (50% of isopropanol or 100% of water) using relatively short polymerization times of only 5 or 6 hours and in the presence of only 0.5% of free radical initiators (di-benzoyl peroxide or potassium persulfate), which are added at the start.

On the basis of a certain increase in viscosity of the resulting reaction solutions, it is assumed that solutions of polyvinylphosphonic acids are also formed under these conditions. No concrete information is given relating to the yield of polyvinylphosphonic acid or the residual monomer content. This cannot be surprising, since the $P^{31}$-NMR spectroscopy which today permits unambiguous determination of non-polymerized monomeric vinylphosphonic acid, in addition to polyvinylphosphonic acid, was not yet available at that time.

Duplications of Examples 3, 4 and 5 of the above Patent and subsequent investigations of the reaction solutions by P-NMR spectroscopy show that the yields of polyvinylphosphonic acid under the experimental conditions disclosed in these Examples is in fact only about 35–40%, or about 6–10%, based on the vinylphosphonic acid employed. At no point in the Patent are there indications of other polymerization conditions which could lead to higher contents of polyvinylphosphonic acid in protic diluents.

In a publication written by the authors of German Pat. No. 1,106,963 (Angew. Chemie 1962, page 974), it is likewise generally declared, without limitation, that vinylphosphonic acid is a compound which readily polymerizes and the homopolymerization of which can easily be initiated. On the basis of these prior publications, the expert must have formed the impression that vinylphosphonic acid can be polymerized in protic diluents in an analogous manner to in aprotic diluents, in good yields and under conditions which require relatively little energy and are specific.

SUMMARY OF THE INVENTION

In contrast to the low yields of polyvinylphosphonic acid disclosed and in contrast to the existing bias, a process has now been found, surprisingly, for the preparation of polyphosphonic acid in protic diluents in which less than 35%, preferably less than 20%, of residual monomeric vinylphosphonic acid results. The process comprises heating vinylphosphonic acid at temperatures of 40° to 130° C. in a total of 10 to 150% by weight of protic diluents for a total of 4 to 60 hours in the presence of 1.0 to 5.5% by weight of aliphatic peroxy-esters, diacylperoxides and/or aliphatic azo compounds which decompose by half in one hour at temperatures below 122° C.

DETAILED DESCRIPTION

The monomeric vinylphosphonic acid is at present accessible on an industrial scale by two different routes.

1. Expensive process (for the preparation of pure vinylphosphonic acid). Tris-(2-chloroethyl) phosphite is prepared from phosphorus trichloride and ethylene oxide and 2-chloroethanephosphonic acid bis-(2-chloroethyl ester), inter alia, is formed therefrom by Arbusov rearrangement. After phosgenation and splitting off of hydrogen chloride by means of heat, vinylphosphonic acid dichloride results, which, after purification by distillation, is hydrolyzed with water to give pure vinylphosphonic acid.

This process is relatively expensive and causes relatively high pollution of the environment. It must first be initiated by phosgenation of chloride atoms, which later have to be removed again in the form of hydrogen chloride.

2. Halogen-free method which does not pollute the environment (for the preparation of "crude vinylphosphonic acid" or "ester-containing crude vinylphosphonic acid").

The dimethyl 2-acetoxyethanephosphonate formed in over 90% yield by reaction of dimethyl phosphite and vinyl acetate is pyrolyzed according to German Offenlegungsschrift No. 3,001,894 at 180°–200° C. to give a "pyrolysate", which still contains methyl groups and also includes, inter alia, various pyro-vinylphosphonic acid derivatives. According to German Offenlegungsschrift No. 3,110,975, action of water on this pyrolysate at temperature of over 100° C. for several hours results in an inexpensive "crude vinylphosphonate", which, according to the $p^{31}$-NMR spectrogram, has the following composition: ("%" here means percentages, in each case based on the total area of all $p^{31}$-resonance signals)

$$CH_2=CH-\overset{O}{\underset{\parallel}{P}}(-OH)_2 \quad 70\text{-}77\%$$

$$CH_2=CH-\overset{O}{\underset{\underset{OH}{|}}{\overset{\parallel}{P}}}-O-C_2H_4-\overset{O}{\underset{\parallel}{P}}(-OH)_2 \quad 2\text{-}7\%$$

$$HOC_2H_4-\overset{O}{\underset{\parallel}{P}}(-OH)_2 \quad 1\text{-}6\%$$

$$CH_3OC_2H_4-\overset{O}{\underset{\parallel}{P}}(OH)_2 \quad 2\text{-}4\%$$

| | |
|---|---|
| $H_3PO_4$ | 6-10% |
| Other P compounds | 3-10% |

Because it is particularly inexpensive, the "ester-containing crude vinylphosphonic acid" formed by addition of at least 2% of water to the "pyrolysate" at temperatures below 100° C. is of particular practical interest.

According to the $p^{31}$-NMR spectrogram, it has the following composition (in % of total P): in these formulae, R denotes hydrogen or methyl)

$$CH_2=CH-\overset{O}{\underset{\parallel}{P}}(-OH)_2 \quad 28\text{-}40\%$$

$$CH_2=CH-\overset{O}{\underset{\underset{OH}{|}}{\overset{\parallel}{P}}}-OCH_3 \quad 20\text{-}30\%$$

$$CH_2=CH-\overset{O}{\underset{\parallel}{P}}(-OCH_3)_2 \quad 2\text{-}6\%$$

$$CH_2=CH-\overset{O}{\underset{\underset{OH}{|}}{\overset{\parallel}{P}}}-O-C_2H_4-\overset{O}{\underset{\underset{OH}{|}}{\overset{\parallel}{P}}}-OR \quad 5\text{-}7\%$$

$$RO-C_2H_4-\overset{O}{\underset{\underset{OH}{|}}{\overset{\parallel}{P}}}-OR \quad 11\text{-}14\%$$

$$RO-\overset{O}{\underset{\parallel}{P}}-(OH)_2 \quad 7\text{-}10\%$$

| | |
|---|---|
| Other P compounds | 0-10% |

Both the pure vinylphosphonic acid and the "crude vinylphosphonic acid" and "ester-containing crude vinylphosphonic acid" accessible by the pollution-free 2nd process are suitable for the process according to the invention. If the latter is used, polyvinylphosphonic acids which partly still carry methyl groups are formed.

Free radical polymerization reactions generally proceed better, the purer the monomers. It was therefore particularly suprising that the "crude vinylphosphonic acid" or the "ester-containing crude vinylphosphonic acid" can also be polymerized under the conditions according to the invention, although they already contain 20-30% of impurities in the form of various P-containing acids which are free from vinyl groups. Besides the acid compounds with free acid groups, the sodium, postassium, ammonium and amine salts can also be used.

The protic diluents are necessary so that the reaction mixtures remain stirrable and workable. Possible protic diluents are: water, monohydric aliphatic alcohols with 1-8, preferably 1-4, carbon atoms, and the water-dilutable and liquid oxyethylates of monohydric alcohols or secondary amines, where these are themselves tertiary amines.

A diluent which is particularly preferred in all cases because of the low cost and the easy handling is water. The phosphorus-containing acid substances which contain vinyl groups, are unavoidably obtained in the pollution-free 2nd preparation process for vinylphosphonic acid and are present in the "crude vinylphosphonic acid" or in the "ester-containing crude vinylphosphonic acid" can also be regarded as diluents which are preferably suitable. They are capable of partly or completely replacing other phosphorus-free diluents, such as, for example, water. Mixtures of the various suitable diluents, preferably mixtures with water, can also in general be used.

The total amounts of diluents during the polymerization are 10-150%, preferably 20-80%, based on the total amount of polymerizable vinylphosphonic acid derivatives.

The more diluent present, especially at the start, the more catalyst and the longer the reaction times required. After the polymerization has been carried out, any desired further amounts of diluents may be added, for example to adjust to a certain viscosity.

It is possible to add an amount of diluents already at the start of the reaction such that the reaction mixture still remains stirrable, at least at the elevated reaction temperatures, even at the end of the polymerization, if the larger amounts of catalysts which are thereby necessary are accepted.

If as small an amount as possible is preferred, it is advisable to add no diluent or only 5-30% of diluent at the start and to add a total of a further 5-145%, preferably 15-75%, continuously or in approximately equal portions at the rate at which the polymerization progresses and too high a viscosity necessitates this operation.

In contrast to the statements made in Examples 3, 4 and 5 of German Pat. No. 1,106,963, it is advisable to cover the reaction mixtures with a layer of inert gas when protic diluents are used. If covering with a layer of inert gas is omitted, polymers are indeed likewise formed. However, relatively somewhat higher residual monomer contents result and discolorations occur.

In contrast to the statements of German Pat. No. 1,106,963, suitable catalysts which act as free radicals are only those which 1. dissociate by half even below 122° C. within one hour and
2. belong to the groups of compounds comprising aliphatic peroxy-esters, aliphatic diacyl peroxides or aliphatic azo compounds.

Suprisingly, other known free radical initiators are unsuitable, since they either react too slowly, such as, for example, di-t-butyl peroxide or t-butyl peroxy-benzoate, or result in discolorations and/or unpleasant odors and/or too high residual monomer contents of far more than 20%, such as, for example, potassium persulfate or dibenzoly peroxide and the like. For practical reasons, of the suitable peroxy compounds, those which dissociate by half even below about 80° C. within one hour are less preferred. They have the disadvantage that, because of their sensitivity to heat, they must be diluted, for example, with aliphatics just after preparation and must be transported or stored at temperatures below 0° C. Such peroxy compounds which may be mentioned are: dimyristyl peroxydicarbonate, diisopropyl peroxydicarbonate, t-butyl peroxyneodecanoate, t-amyl peroxyneodecanoate, t-butyl perpivalate and bis-(3,5,5-trimethylhexanoyl) peroxide. The aliphatic azo compounds, such as, for example, azo-bis-(isobutyronitrile) are also less preferable.

In contrast, aliphatic diacyl peroxides or peroxyesters which are easy to handle and dissociate at most by half between 80° and 122° C. within one hour, such as, for example, didecanoyl peroxide, dilauroyl peroxide, t-butyl peroxyisobutyrate, t-butyl peroxy-3,5,5-trimethylhexanoate and t-butyl peroxyacciate, are preferred. t-Butyl peroxy-2-ethyl-hexanoate, which dissociate by half at 92° C. within one hour, is particularly preferred. Mixtures of the catalysts can also be used.

The total amounts of catalysts necessary are 1 to 5.5%, preferably 1.5–4%, and are thus substantially higher than those mentioned in Examples 3, 4 and 5 of German Pat No. 1,106,963. If less than 1.0% of catalyst is used, residual monomer contents which are sometimes far above 35% result. The amounts of catalyst required are lower, the less diluent present.

It can be seen from German Pat. No. 1,106,963 that the total amount of catalyst must always be added at the start of the polymerization. This procedure is not preferred in the process claimed. With the necessary high monomer concentrations, it leads to a highly exothermic reaction at the start and overall to relatively higher residual monomer contents. Rather, it is preferable to maintain for a period of several hours a concentration of molecules which donate free radicals which is as uniform as possible. This can be effected, for example, by a procedure in which, when the reaction temperature has been reached, only 0.1–1%, preferably 0.3 to 0.8%, of the catalysts are first added at the start of the polymerization and a total of a further 0.9–5.4%, preferably 1.2–3.9%, of the catalysts is added during the reaction, continuously or divided into 1–24, preferably 2–12, equal portions added at approximately equal intervals of time. When the addition of catalyst has ended, the mixture must subsequently be stirred for a further 1 to 10, preferably 2–6, hours at elevated temperature, advantageously at the reaction temperature.

The reaction temperatures can be between 40° C. and 130° C., preferably between 60° and 110 °C. They depend on the dissociation half-life of the catalyst used. Reaction temperatures which are at most about ±25 °C., particularly preferably ±0° to 10° C., below or above the temperature at which the dissociation half-life of the catalyst used is one hour are particularly suitable.

The reaction times suitable are approximately inversely proportional to the concentrations of monomeric vinylphosphonic acid, the concentrations of catalysts and the reaction temperatures specific for the catalyst used. They are in total, including the subsequent stirring time, between 4 and 60 hours, preferably between 10 and 30 hours.

The contents of polyvinylphosphonic acid and of residual vinylphosphonic acid in the end products can be determined exactly by $P^{31}$-NMR spectroscopy. Iodine number determinations also provide information relating to the residual monomer content. The viscosity of the reaction products obtained is, in 70% strength aqueous solution, for example about 50,000–100,000 mPa.s, if pure vinylphosphonic acid is used. If pure vinylphosphonic acid is used, virtually pure solid polyvinylphosphonic acid can be obtained in a very simple manner by stripping off the diluent in vacuo. In principle, it is also possible, if desired, substantially to purify polyvinylphosphonic acid which has been obtained starting from "crude vinylphosphonic acid" or "ester-containing crude vinylphosphonic acid" in protic diluents, by precipitation of the polymer contents.

The resulting solutions of polyvinylphosphonic acid can be used directly, and the solids obtained therefrom can be used indirectly, after being dissolved in protic solvents, such as, preferably, for example, water, in many ways, for example for protection from corrosion, for flameproofing of textiles, for production of printing plates, for improving washing and cleaning agents and the like.

The essential differences between the present invention and the overall teachings of German Pat No. 1,106,963 are illustrated in more detail by the Examples and Comparison Examples which follow.

The grades of vinylphosphonic acids polymerized in the Comparison Examples and in the Examples have, according to their $P^{31}$-NMR spectra, the composition given below. The percentages relate to the percentage of phosphorus from the total phosphorus. They approximately agree with the usual percentages by weight, since the particular molecular weight of the individual phosphorus compounds present deviate only relatively slightly from one another.

In these formulae, R denotes H in acids 2, 3 and 4, H or $CH_3$ in the ester 5 and H or Na in the salt 6, and X denotes H or $CH_3$.

| Acid No. | Acid grade |
|---|---|
| 1 | Pure vinylphosphonic acid |
| 2 | Crude vinylphosphonic acid I |
| 3 | Crude vinylphosphonic acid II |
| 4 | Crude vinylphosphonic acid III |
| 5 | Ester-containing crude vinylphosphonic acid |
| 6 | Mono-sodium salt of vinylphosphonic acid |

| Acid grade No. | 1 | 2 | 3 | 4 | 5 | 6 |
|---|---|---|---|---|---|---|
| $CH_2=CH-P(O)(OH)_2$ | 100 | 74.5 | 76.2 | 72.9 | 30.8 | 0 |
| $CH_2=CH-P(O)(OH)(ONa)$ | 0 | 0 | 0 | 0 | 0 | 96.3 |
| $CH_2=CH-P(O)(OH)(OCH_3)$ | 0 | 0 | 0 | 0 | 26.6 | 0 |
| $CH_2=CH-P-(O)(OCH_3)_2$ | 0 | 0 | 0 | 0 | 4.9 | 0 |
| $CH_2=CH-P(O)(OH)OC_2H_4P(O)(OH)(OR)$ | 0 | 6.5 | 2.0 | 4.6 | 6.5 | 0 |
| $XO-C_2H_4P(O)(OH)(OR)$ | 0 | 4.8 | 2.6 | 7.7 | 13.4 | 0 |
| $RO-P(O)(OH)_2$ | 0 | 8.0 | 8.7 | 9.0 | 8.9 | 3.7 |
| Unknown P compounds | 0 | 5.5 | 10.5 | 7.8 | 0.1 | 0 |

1. COMPARISON EXAMPLES

These describe unsuitable reaction conditions, such as, in particular, unsuitable catalysts, amounts of catalysts which are too low and/or too much diluent.

1.1. COMPARISON EXAMPLES STARTING FROM PURE VINYLPHOSPHONIC ACID

COMPARISON EXAMPLE 1 (corresponds to Example 3 of German Pat. No. 1,106,963)

50 g of pure vinylphosphonic acid are dissolved in 50 g of isopropanol and the solution is heated at 85°–90° C. for 5 hours together with 0.25 g of water-moist 75% pure di-benzoyl peroxide (=0.38% of 100% pure substance). A solution in which, according to the $p^{31}$-NMR spectrum, 62.9% of the phosphorus is still present as vinylphosponic acid and only 35.9% is present as polyvinylphosphonic acid results.

COMPARISON EXAMPLE 2

If the procedure followed is as in Comparison Example 1 but the mixture is continuously covered with a blanket of nitrogen, 77.6% of the phosphorus in the end product is still as vinylphosphonic acid and only 20.6% is a polyvinylphosphonic acid.

COMPARISON EXAMPLE 3 (corresponds to Example 4 of German Pat. No. 1,106,963)

50 g of pure vinylphosphonic acid are dissolved in 25 g of water and the solution is kept at 90° C. for 6 hours together with 0.25 g (=0.5%) of potassium persulfate. A solution is formed in which, according to the $p^{31}$-NMR spectrum, 93.8% of the phosphorus is still present as vinylphosphonic acid and only 6.0% is present as polyvinylphosphonic acid.

COMPARISON EXAMPLE 4

The procedure followed is as in Comparison Example 3, but under nitrogen. Only 2.4% of the phosphorus is converted into polyvinylphosphonic acid here.

COMPARISON EXAMPLE 5

100 g of pure vinylphosphonic acid and 5 ml of water are heated to 80° C. under nitrogen and 0.3 g of ammonium persulfate are added. In each case a further 0.3 g of ammonium persulfate is then added four times, at intervals of three hours, the total thus being 1.5%. The mixture is subsequently stirred at 80° C. for a further 12 hours. The $p^{31}$-NMR spectrum shows that 84.5% of the phosphorus is still present as vinylphosphonic acid and only 15.5% is present as polyvinylphosphonic acid.

COMPARISON EXAMPLE 6

(corresponds to Example 5 of German Patent 1,106,963)

32.5 g of the mono-sodium salt of vinylphosphonic acid dissolved in 32.5 g of water are heated at 85° C. for 5 hours together with 0.17 g (=0.5%) of potassium persulfate. A solution is formed in which, according to the $p^{31}$-NMR spectrum, less than 10% of the phosphorus is present in the form of the polymeric sodium salt.

Equivalent results are obtained if the reaction batch is continuously blanketed with nitrogen.

COMPARISON EXAMPLE 7

100 g of pure vinylphosphonic acid and 5 ml of water are heated to 110° C. under nitrogen and, after 30 minutes, 0.4 ml of t-butyl peroxybenzoate (specific gravity at 20° C.=1.03 (g/ml) is added. In each case a further 0.2 ml of the catalyst is then subsequently added 13 times at intervals of 2 hours, the total used thus being 3.1%. After subsequently stirring the mixture for 4 hours, 20 ml of water are added. 124.5 g of a brown viscous solution still containing, according to the $p^{31}$-NMR spectrum, 44.5% of vinylphosphonic acid and only 55.0% of polyvinylphosphonic acid, are formed.

COMPARISON EXAMPLE 8

The procedure followed is analogous to Comparison Example 7, but 3 g of 75% pure di-benzoyl peroxide (=2.25%) are used instead of a total of 3 ml of t-butyl peroxy-benzoate, and the mixture is heated to only 80° C. 123 g of a dark brown solution result, in which 67.9% of the total phosphorus is still present as vinylphosphonic acid and only 31.9% is present as polyvinylphosphonic acid.

COMPARISON EXAMPLE 9

50 g of pure vinylphosphonic acid and 5 ml of water are heated to 90° C. under nitrogen. After 30 minutes, 0.1 ml of t-butyl peroxy-2-ethyl-hexanoate (specific gravity at 20°=0.89 (g/ml)) are added and in each case 0.1 ml of the catalyst is added 4 times at intervals of 2 hours, the total being 0.5 ml (=0.9%), and the mixture is subsequently stirred for a further 10 hours.

According to the $p^{31}$-NMR spectrum, 40.2% of the total phosphorus is still present as vinylphosphonic acid and only 59.8% is present as polyvinylphosphonic acid.

COMPARISON EXAMPLE 10

100 g of pure vinylphosphonic acid and 50 ml of water are heated to 90° C. under nitrogen, and 1.1 ml (=1.0%) of t-butyl 2-ethyl-hexanoate are added only at the start. After the mixture has been subsequently stirred at 90° C. for 7 hours, 83.6% of the vinylphosphorus is still unconverted.

1.2. COMPARISON EXAMPLES WITH CRUDE VINYLPHOSPHONIC ACID COMPARISON EXAMPLE 11

40 g of crude vinylphosphonic acid II and 5 ml of water are heated to 130° C. under nitrogen, and 0.3 ml of t-butyl peroxide (specific gravity at 20°=0.79 (g/ml)) is added. The mixture is then heated to 145° C. In each case a further 0.2 ml of catalyst is subsequently added four times at intervals of 2 hours. Total amount of catalyst =2.2%. After the mixture has been subsequently stirred at 145° C. for 4 hours, it is diluted with 15 ml of water at 90° C. According to the $p^{31}$-NMR spectrum, only 38.1% of the vinyl-phosphorus is present as polyvinylphosphonic acid.

COMPARISON EXAMPLE 12

If the procedure in Comparison Example 11 is followed, but a total of 1.1 ml (=2.8%) of t-butyl peroxybenzoate is used as the catalyst and the reaction is carried out at only 130° C., a product in which only 49.0% of the vinyl-phosphorus is found as polyvinylphosphonic acid results.

COMPARISON EXAMPLES 13 and 14

If the reaction conditions of Comparison Examples 5 and 8 are applied but crude vinylphosphonic acid II is used instead of pure vinylphosphonic acid, percentages of unconverted vinyl-phosphorus of 89.8% and, respectively, 85.7% result.

1.3 COMPARISON EXAMPLES WITH ESTER-CONTAINING CRUDE VINYLPHOSPHONIC ACID

COMPARISON EXAMPLE 15

40 g of ester-containing crude vinylphosphonic acid and 5 ml of water are heated to 100° C. under nitrogen, and 0.3 ml of t-butyl peroxbenzoate is added. The mixture is heated at 130° C., and 0.3 ml of catalyst are subsequently added after 3 hours, followed by a further 0.3 ml (total amount of catalyst =2.3%) after another 3 hours. The mixture is subsequently stirred at 130° C. for 3 hours and 12 ml of water are added at 100° C. The reaction solution is brown-colored. It has a polymer content of 59.8% and still contains 40.2% of unconverted vinyl-phosphorus.

COMPARISON EXAMPLE 16

The procedure followed is as in Comparison Example 15. However, a total of 1.5 ml of di-t-butyl peroxide (=3.0%) is used and the reaction temperature is kept at 145° C. The end product still contains 56.0% of the vinyl-phosphorus in unconverted from.

COMPARISON EXAMPLE 17

Comparison Example 5 is repeated and the ester-containing crude vinylphosphonic acid is used instead of the pure vinylphosphonic acid.

80.9% of the vinyl-phosphorus still remains unconverted.

COMPARISON EXAMPLE 18

40 g of ester-containing crude vinylphosphonic acid are heated to 120° C. under nitrogen, and 0.3 ml (=0.7%) of t-butyl peroxy-3,5,5-trimethyl-hexanoate is added.

After 40 minutes, the stirrer must be switched off because of the increase in viscosity. The reaction mixture is kept at 120° C. for a further 3 hours, without stirring. 15 ml of water are stirred in at 90° C., after gradually lowering the stirrer.

The resulting solution still contains 56.2% of unconverted vinyl-phosphorus.

COMPARISON EXAMPLE 19

If Comparison Example 18 is repeated with twice the amount of catalyst (=1.4%), 44.8% of the vinylphosphorus still remain unconverted. Mixing problems likewise arise.

EXAMPLES

These describe suitable and claimed reaction conditions.

2.1. EXAMPLES STARTING FROM PURE VINYLPHOSPHONIC ACID (VPA)

Examples 1–12

In general, t-butyl peroxy-2-ethyl-hexanoate (specific gravity =0.89 (g/ml) is used as the catalyst and water is used as the diluent.

| Example No. | 1 | 2 | 3 | 4 | 5 | 6 | 7 | 8 | 9 | 10 | 11 | 12 |
|---|---|---|---|---|---|---|---|---|---|---|---|---|
| Pure VPA (g) initially introduced | 400 | 100 | 100 | 50 | 40 | 50 | 50 | 50 | 50 | 50 | 50 | 100 |
| Total water during the reaction (g) | 160 | 35 | 50 | 35 | 15 | 20 | 20 | 20 | 20 | 50 | 25 | 40 |
| Water during the reaction (% by weight/VPA) | 40 | 35 | 50 | 70 | 38 | 40 | 40 | 40 | 40 | 100 | 50 | 40 |
| Only water at the start (g) | 40 | 5 | 50 | 35 | 15 | 10 | 20 | 20 | 10 | 50 | 25 | 10 |
| Only n further additions of water (g) | 3 × 40 | 3 × 10 | 0 | 0 | 0 | 1 × 10 | 0 | 1 × 10 | 1 × 10 | 0 | 0 | 6 × 5 |
| Only addition of water at the end (g) | 0 | 20 | 0 | 0 | 15 | 0 | 0 | 0 | 5 | 0 | 0 | 20 |
| Total catalyst (ml) | 12.0 | 2.0 | 3.6 | 1.5 | 1.5 | 1.5 | 1.5 | 1.5 | 1.6 | 1.5 | 1.0 | 2.0 |
| Total catalyst (% by weight/VPA) | 2.7 | 1.8 | 3.0 | 2.7 | 3.3 | 2.7 | 2.7 | 2.7 | 2.8 | 2.7 | 1.8 | 1.8 |
| Only catalyst at the start (ml) | 1.0 | 0.4 | 1.0 | 0.3 | 0.3 | 0.3 | 1.5 | 1.5 | 0.2 | 0.3 | 0.7 | 0.4 |
| Only m further additions of catalyst (ml) | 11 × 1.0 | 8 × 0.2 | 10 × 0.16 | 8 × 0.15 | 4 × 0.3 | 4 × 0.3 | 0 | 0 | 7 × 0.2 | 6 × 0.2 | 4 × 0.2 | 10 × 0.16 |
| Weight of the end solution (g) | 563 | 149 | 141 | 82 | 65 | 70 | 70 | 79 | 75 | 96 | 73 | 158 |
| % by weight of solids | 71.0 | 67.1 | 70.9 | 61.0 | 61.5 | 71.4 | 71.4 | 63.3 | 66.7 | 52.1 | 68.5 | 63.3 |
| Nitrogen layer | yes | yes | yes | yes | yes | yes | yes | yes | no | yes | yes | yes |
| Reaction temperature (°C.) | 90 | 90 | 90 | 90 | 90 | 90 | 90 | 90 | 90 | 90 | 90 | 90 |
| Reaction time until the end of catalysis (hours) | 22 | 12 | 24 | 13 | 14 | 4 | 0.5 | 0.5 | 13 | 10 | 8 | 11 |
| Subsequent stirring time (hours) | 4 | 2 | 10 | 4 | 8 | 3 | 4.5 | 8.5 | 4 | 13 | 5 | 1 |
| % P from unconverted VPA in the end product | 1.5 | 2.0 | 1.12 | 18.3 | 0.8 | 3.8 | 11.9 | 9.0 | 10.6 | 25.7 | 23.9 | 3.8 |
| % P from polyvinylphosphonic acid in the end product | 97.8 | 97.7 | 97.8 | 81.0 | 98.6 | 95.7 | 87.5 | 90.4 | 88.7 | 73.6 | 75.7 | 95.9 |

Without a nitrogen blanket (Example 9), a marked brown coloration occurs during the reaction. If the reaction is carried out as in Example 1, but the catalyst is continuously added dropwise, a similar reaction mixture results.

| Catalyst used in these examples: | Specific gravities (g/ml) at 20° C. |
|---|---|
| I = t-Butyl peroxy-3,5,5-trimethyl-hexanoate | 0.89 |
| II = t-Butyl peroxypivalate (75% strength in aliphatics) | 0.86 |
| III = t-Butyl peroxy-iso-decanoate (75% strength in aliphatics) | 0.86 |
| IV = Diisopropyl peroxydicarbonate (40% strength in phthalate) | 1.06 |
| V = Lauroyl peroxide | — |
| VI = Azo-bis-(isobutyronitrile) | — |

The Examples were in all cases carried out in water under a layer of nitrogen.

| Example No. | 13 | 14 | 15 | 16 | 17 | 18 | 19 |
|---|---|---|---|---|---|---|---|
| Pure VPA (g) initially introduced | 100 | 40 | 100 | 100 | 100 | 100 | 50 |

| Example No. | 13 | 14 | 15 | 16 | 17 | 18 | 19 |
|---|---|---|---|---|---|---|---|
| Total water during the reaction (g) | 50 | 10 | 35 | 45 | 45 | 45 | 20 |
| Water during the reaction (% by weight/VPA) | 50 | 25 | 35 | 45 | 45 | 45 | 40 |
| Only water at the start (g) | 50 | 10 | 5 | 5 | 5 | 5 | 20 |
| Only n further additions of water (g) | 0 | 0 | 3 × 10 | 4 × 10 | 4 × 10 | 4 × 10 | 0 |
| Only addition of water at the end (g) | 20 | 21 | 10 | 10 | 20 | 10 | 5 |
| Type of catalyst (I–VI) | I | I | II | III | IV | V | VI |
| Total catalyst (ml) | 3.6 | 1.2 | 4.0 | 4.0 | 7.5 | 2 g | 1.5 g |
| Total 100% pure catalyst (% by weight/VPA) | 3.2 | 2.7 | 2.6 | 2.6 | 2.6 | 2.0 | 3.0 |
| Only catalyst at the start (ml) | 0.4 | 0.4 | 0.4 | 0.4 | 1.0 | 0.4 g | 0.3 g |
| Only m further additions of catalyst (ml) | 8 × 0.4 | 2 × 0.4 | 13 × 0.28 | 9 × 0.4 | 10 × 0.65 | 8 × 0.2 | 4 × 0.3 g |
| % by weight of the end solution (g) | 158 | 71 | 140 | 149.5 | 166.5 | 149 | 70 |
| % by weight of solids | 63.3 | 56.3 | 71.4 | 66.9 | 60.1 | 67.1 | 71.4 |
| Reaction temperature | 98 | 101 | 80 | 70 | 62 | 80 | 80 |
| Reaction time until the end of catalysis (hours) | 38 | 6 | 22 | 15 | 19 | 13 | 7 |
| Subsequent stirring time (hours) | 5 | 10 | 5 | 8 | 2 | 5 | 5 |
| % P from unconverted VPA in the end product | 1.6 | 0.6 | 19.1 | 10.6 | 1.7 | 3.8 | 27.0 |
| % P from polyvinylphosphonic acid in the end product | 96.8 | 98.1 | 80.9 | 89.2 | 98.1 | 96.0 | 73.0 |

EXAMPLE 20

32.5 g (0.25 mole) of the mono-sodium salt of vinylphosphonic acid and 15 ml of water are heated to 90° C. under nitrogen, and 0.2 ml of t-butyl peroxy-2-ethyl-hexanoate is added. In each case a further 0.2 ml of catalyst is subsequently added seven times at intervals of 2 hours. Total amount of catalyst = 1.6 ml (=4.4%). The mixture is diluted with 10 ml of water 10 hours after the start of the addition of catalyst. The mixture is subsequently stirred at 90° C. for 5 hours and a further 10 ml of water are added. 66 g of a solution in/which only 10.1% of the total phosphorus is still present as sodium vinylphosphonate result.

EXAMPLE 21

100 g of vinylphosphonic acid and 50 g of methanol are heated to 60° C. under nitrogen. 1 ml of a 40% strength solution of diisopropyl peroxydicarbonate in phthalate is added at the start, and a further 0.5 ml of the catalyst is subsequently added 13 times at intervals of two hours. Total amount of catalyst=3.2%.

The mixture is then subsequently stirred at 0° C. for three hours and diluted with 20 g of methanol. 168.4 g of a solution in which only 11.3% of the total phosphorus is still present as vinylphosphonic acid result.

EXAMPLE 22

50 g of pure vinylphosphonic acid and 10 g of isopropanol are heated to 80°–85° C. under nitrogen, and 0.2 ml of t-butyl peroxy-2-ethyl-hexanoate is added. In each case 0.2 ml of the catalyst is subsequently added a further 7 times at intervals of two hours. Total amount of catalyst: 1.6 ml (=2.8%). In the meantime, the mixture must be further diluted three times with in each case 10 g of isopropanol.

The mixture is subsequently heated at 80°–85° C. for 4 hours. Thereafter, it is diluted again with 30 g of isopropanol. 118 g of a solution in which only 5.0% of the total phosphorus is still present as vinylphosphonic acid and 94.7% is present as polyvinylphosphonic acid result.

2.2. EXAMPLES STARTING FROM CRUDE VINYLPHOSPHONIC ACID

EXAMPLE 23

100 g of crude vinylphosphonic acid I containing 5% of water are heated to 90° C. under nitrogen, and 0.4 ml of t-butyl 2-ethyl-hexanoate is added. In each case a further 0.2 ml is subsequently added after intervals of two hours.

Total amount of catalyst:

3 ml (=2.7%). In the meantime, the mixture must be diluted twice with in each case 10 ml of water. 126 g of a solution in which, according to the $P^{31}$-NMR spectrum, only 1.8% of the vinyl-phosphorus is still present in unreacted form result.

EXAMPLE 24

If the procedure followed is as in Example 23, but the mixture is diluted in the meantime with 2 × 10 g of methanol and not with water and stirring is continued at 80° C., 118 g of a solution in which only 9.6% of the vinylphosphorus is still unreacted result.

EXAMPLE 25

400 g of crude vinylphosphonic acid III containing 5% of water and 40 ml of water are heated to 90° C. under nitrogen, and initially only 1 ml of t-butyl peroxy-2-ethyl-hexanoate is added. In each case 1 ml of catalyst is subsequently added again eleven times at intervals of two hours. Total amount of catalyst: 12 ml (=2.7%). In the meantime, the mixture must be diluted with two 20 ml portions of water.

Yield: 481.4 g. Only 2.9% of the vinyl-phosphorus has still not reacted.

EXAMPLE 26

100 g of dehydrated crude vinylphosphonic acid I and 20 g of isobutanol are heated to 90° C. under nitrogen. Only 0.4 ml of t-butyl peroxy-2-ethyl-hexanoate is added at the start, and in each case a further 0.3 ml of catalyst is subsequently added twelve times at intervals of two hours. (Total amount: 4 ml=3.6%). In the meantime, the mixture must be diluted twice with in each case 10 g of isobutanol. The mixture is subsequently stirred at 90° C. for 2 hours and diluted again with 15 g of isobutanol before cooling.

Yield: 152 g of a solution in which only 10.3% of the vinyl-phosphorus still remains in unpolymerized form.

2.3. EXAMPLES STARTING FROM ESTER-CONTAINING CRUDE VINYL-PHOSPHONIC ACID

Example 27

100 g of ester-containing crude vinylphosphonic acid and 7 ml of water are heated to 90° C. under nitrogen, and 0.5 ml of t-butyl peroxy-2-ethyl-hexanoate is added. In each case a further 0.25 ml of catalyst is added 10 times at intervals of 2 hours. Total amount: 3 ml (=2.7%). In the meantime, the mixture must be diluted once with 10 ml of water. The mixture is subsequently stirred at 90° C. for 4 hours and is diluted with a further 15 ml of water before cooling.

Yield: 130 g of a solution in which only 5.5% of the vinyl-phosphorus is still not polymerized.

EXAMPLE 28

100 g of ester-containing crude vinylphosphonic acid and 20 g of isobutanol are heated to 90° C. under nitrogen. Only 0.4 ml of t-butyl peroxy-2-ethyl-hexanoate is added at the start, and then in each case 0.3 ml of the catalyst is subsequently added ten times at intervals of two hours and, after a further two hours, finally a further 0.6 ml of the catalyst is subsequently added. Total amount of catalyst: 4 ml (=3.6%). In the meantime, the mixture must be diluted twice with in each case 10 g of isobutanol to ensure stirrability. After the addition of the catalyst, the mixture is subsequently stirred at 90° C. for a further 90 minutes. Before cooling, the mixture is diluted again with 25 g of isobutanol. 158 g of a solution in which only 12.0% of the vinylphosphorus has still not polymerized result.

EXAMPLE 29

100 g of ester-containing crude vinylphosphonic acid are heated to 90° C. under nitrogen. 0.4 ml of t-butyl butyl peroxy-2-ethyl-hexanoate are first added and in each case 0.26 ml is added 10 times at intervals of two hours.

Total amount: 3 ml (=2.7%). In the meantime, the mixture is diluted three times with in each case 10 g of methanol. After the mixture has been subsequently stirred at 90° C. for three hours, a further 10 g of methanol are added. Yield: 135 g. Only 16.8% of unreacted vinyl-phosphorus is still present in the solution.

We claim:

1. A process for the preparation of a polymer of vinylphosphonic acid in a protic diluent with the aid of a catalyst which forms free radicals, which comprises heating vinylphosphonic acid at temperatures of 40° to 130° C. in a total of 10 to 150% by weight of a protic diluent for a total of 4–60 hours in the presence of 1.0 to 5.5% by weight of an aliphatic peroxy-ester, an aliphatic diacyl peroxide or mixtures thereof which decompose by half in one hour at temperatures below 122° C.

2. The process as claimed in claim 1, wherein only 0.1 to 1% by weight of the total amount of catalyst is added at the start of the reaction and a further 0.9 to 5.4% by weight of the catalyst is added uniformly in the course of the reaction.

3. The process as claimed in claim 1, wherein the reaction is carried out in the presence of an aliphatic peroxy-ester or diacyl peroxide which dissociates by half between 80° C. and 121° C. within one hour.

4. The process as claimed in claim 1, wherein vinylphosphonic acid which contains up to 30% by weight of phosphonic acid which contains up to 30% by weight of phosphonic acids and phosphoric acid or the monomethyl esters of these acids is polymerized.

5. The process as claimed in claim 1, wherein the polymer of vinylphosphonic acid is essentially a polyvinylphosphonic acid or a methyl ester thereof.

6. The process as claimed in claim 1, wherein the monomer consists essentially of pure vinylphosphonic acid or vinylphosphonic acid containing up to 30% by weight of phosphonic acids and phosphoric acid or the monomethyl esters of these acids.

* * * * *